P. JANEK.
AUTOMOBILE BRAKE AND JACK.
APPLICATION FILED APR. 17, 1911.

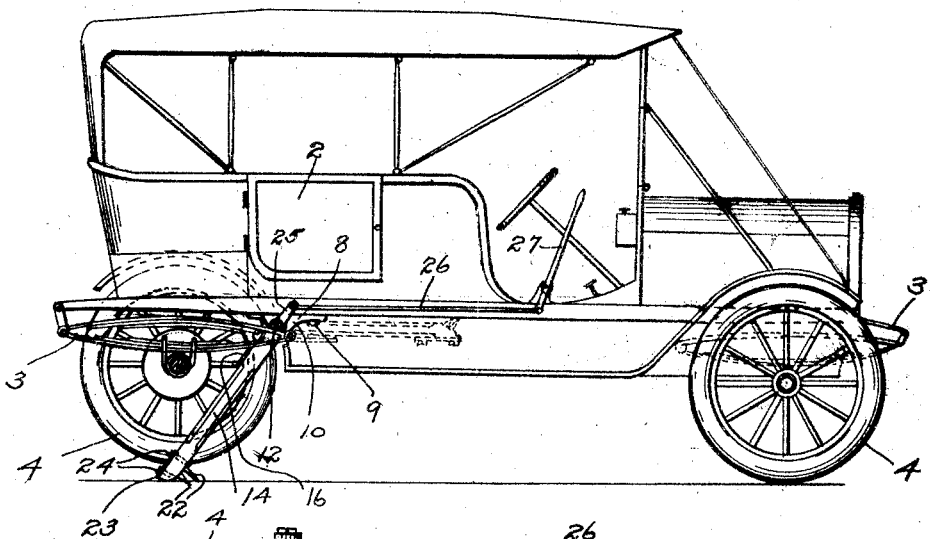

1,021,779.

Patented Apr. 2, 1912.

2 SHEETS—SHEET 2.

Witnesses:
H. J. Gettins.
N. L. McDonnell.

Inventor:
Paul Janek
by Lynch & Dorer
his Attorneys.

UNITED STATES PATENT OFFICE.

PAUL JANEK, OF CLEVELAND, OHIO.

AUTOMOBILE BRAKE AND JACK.

1,021,779.

Specification of Letters Patent.

Patented Apr. 2, 1912.

Application filed April 17, 1911. Serial No. 621.472.

*To all whom it may concern:*

Be it known that I, PAUL JANEK, a subject of the Emperor of Austria-Hungary, residing at Cleveland, in the county of Cuyahoga and State of Ohio, have invented certain new and useful Improvements in Automobile Brakes and Jacks; and I hereby declare the following to be a full, clear, and exact description of the invention, such as will enable others skilled in the art to which it pertains to make and use the same.

This invention relates to new and useful improvements in vehicle brakes, and particularly to a brake for automobiles.

The object of this invention is to provide an emergency brake for a vehicle which can be quickly operated, which will be very effective in stopping the motion of the vehicle and which will at the same time tend to lessen the shock of the sudden stoppage of the vehicle to a greater extent than the brakes now in use.

A further object of my invention is to provide a device of this character which can also be utilized as a jack for lifting the rear portion and back wheels of a vehicle in case it is necessary to make repairs to the machinery or tires of the rear wheels.

With these objects in view my invention therefore consists in the features of construction and combination of parts, the preferred form of which is illustrated in the accompanying drawings, described in the specification and set forth in the appended claims.

Figure 6:
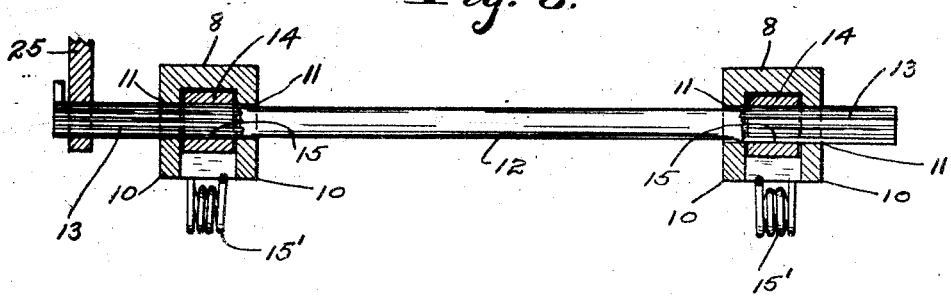
Figure 7:
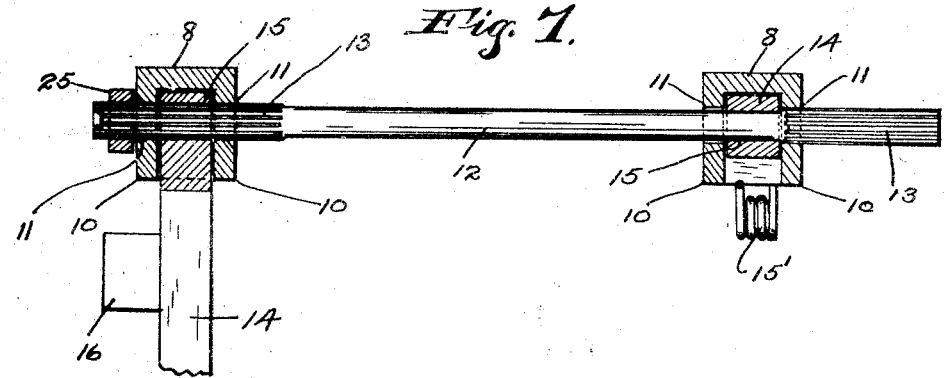

Referring to the accompanying drawings Figure 1 is a side elevation of an automobile showing my improved brake applied thereto. Fig. 2 is a bottom plan of the same. Fig. 3 is a detail view in section of the bracket support for the brake member. Fig. 4 is a detail view showing the plate on the brake member in contact with the automobile spring. Fig. 5 is an enlarged view of the end of the brake member showing the removable spikes and the method of holding the same in position. Fig. 6 is a section on line 6—6, Fig. 3. Fig. 7 is a figure similar to Fig. 6 showing the brake supporting shaft shifted.

Again referring to the drawings 2 represents the body of an automobile which is provided with the usual supporting springs 3 and wheels 4 which are secured thereto in the usual manner. On the bottom of the body, at each side thereof is rigidly secured a bracket member 8 by means of bolts 9, and each bracket member is provided with a pair of downwardly extending flanges 10, and in the said flanges are formed openings 11. A shaft 12 extends transversely of the body 2 and the ends thereof extend through the said openings 11 in the said flanges 10 and at each end the shaft is provided with corrugations or longitudinally extending teeth 13. Between each pair of flanges 10 on the shaft 12 is mounted a brake member 14 which is provided with an opening 15 adapted to receive the end of the shaft, the wall of the said opening being serrated so as to engage with the teeth on the shaft and thereby lock the brake member to the shaft. The shaft 12 is mounted in the flanges 10 so as to be capable of both a rotary and longitudinal movement and the arrangement of the teeth on each end of the shaft is such that by shifting the shaft longitudinally in either direction the smooth portion of the shaft will extend through the opening in one of the brake members so that if the shaft is rotated it will not cause any movement of the said brake member, the object of which will appear later. To each of the bracket members 8 is secured a spring 15', the free end of which extends out under the adjacent brake member when the brake member is in its normal or up position and serves not only to hold the brake member steady and prevent the rattling of the same but also serves as a cushioning means to absorb a portion of the jar when the brake members are swung down into their operative position and in contact with the ground. In order to further absorb the shock consequent upon the operation of the brake member a plate 16 is rigidly secured to each brake member and these plates are so located that when the brake members are thrown down by the rotation of the brake shaft into their operative position the said plates will come in contact with the supporting springs under the rear portion of the body 2 and the resiliency of the springs will tend to nullify the shock occasioned by the brake members coming in contact with the ground so that the machine will stop without causing any excessive jar to the machinery. In the lower end of each brake member 14 are mounted a plurality of spikes 22 which are arranged to penetrate the ground when the brake member is swung down into its operative position. These spikes are held in place by a plate 23 which is secured to the brake member by bolts 24.

The object of this arrangement is to enable the spikes to be readily removed when they become worn down or broken. To one end of the shaft 12, which supports the brake members 14, is secured a small arm 25 and this arm is operatively connected by a brake rod 26 with the usual brake lever 27 which is pivotally supported on the body of the vehicle.

The operation of my device is as follows:—The device is designed primarily to be used as a brake only in cases of emergency when it becomes necessary to stop the vehicle in a very short space, in which case the operator by moving the brake lever rearwardly in the usual manner will cause a rotation of the shaft 12 which will swing down the brake members 14 in contact with the surface over which the vehicle is traveling, and after the brake members are in engagement therewith the continued movement of the vehicle will cause the rear portion of the vehicle to rise up on the brake members as pivots so that the rear wheels will be entirely lifted from the surface on which the vehicle is traveling and the brake members will then extend rearwardly and the plates 16 thereon will be in engagement with the springs 3 on the rear of the body portion. Now, when it is desired to use the device as a jack, if it is necessary to lift the entire rear of the machine the car is started and the brake is then thrown down and the motion thereof will cause the rear portion of the car to ride up on the brake members and the rear wheels will then be lifted off of the ground as before described. If it is desired to simply jack up one wheel the shaft 12 is shifted longitudinally by giving the end of the shaft a sharp rap with any convenient tool or the heel of a shoe, so that the teeth on the shaft 12 at the side of the machine, which it is not desired to lift, will be disengaged from the brake member at that side, but the brake member on the side which is to be lifted will be still engaged by the shaft. The brake lever is then operated and the brake member on the side which is to be lifted will be swung down and when the car is started it will ride up on the brake member which has been swung down, and the wheel at the side of the car adjacent to the brake member which has been swung down will be lifted off the ground, but the wheel on the opposite side will remain on the ground so that in order to reset the brake it will only be necessary to back the car.

What I claim is,—

1. The combination with a vehicle body and springs arranged under the rear end thereof of a pair of brackets secured to said vehicle body, a shaft rotatably supported by said brackets, brake members secured to said shaft and in their normal position adapted to extend longitudinally of the vehicle body and in their operative position adapted to extend downwardly into engagement with the surface over which the vehicle is moving, means for rotating said shaft so as to swing the brake members down into their operative positions and a plate mounted on each brake member and adapted to come in contact with the supporting springs on the rear of the vehicle body, for the purpose set forth.

2. The combination with a vehicle body of a pair of brackets secured to said vehicle body, each bracket being provided with a pair of downwardly extending flanges provided with bearing openings, a shaft serrated at each end journaled in said flanges, a brake member mounted on said shaft between the flanges of each bracket member, said brake member having a serrated opening to receive the said shaft and means for rotating said shaft so as to bring the free ends of the brake members in contact with the surface over which the vehicle is moving.

In testimony whereof, I sign the foregoing specification, in the presence of two witnesses.

PAUL JANEK.

Witnesses:
VICTOR C. LYNCH,
STEPHAN G. STARVER.